United States Patent [19]

Hein

[11] Patent Number: 4,976,332

[45] Date of Patent: Dec. 11, 1990

[54] CIRCUIT ARRANGEMENT FOR THE DRIVE OF A VEHICLE

[75] Inventor: Theo Hein, Lohr/Main, Fed. Rep. of Germany

[73] Assignee: Mannesmann Rexroth GmbH, Lohr/Main, Fed. Rep. of Germany

[21] Appl. No.: 232,716

[22] Filed: Aug. 16, 1988

[30] Foreign Application Priority Data

Aug. 19, 1987 [DE] Fed. Rep. of Germany ....... 3727690

[51] Int. Cl.$^5$ .............................................. B60K 17/34
[52] U.S. Cl. ..................................... 180/197; 105/61; 364/426.03
[58] Field of Search ................ 180/197, 6.5, 305, 308; 60/427, 484; 364/426.03, 426.05; 105/76, 73

[56] References Cited

U.S. PATENT DOCUMENTS

| | | | |
|---|---|---|---|
| 3,893,535 | 7/1975 | Burckhardt et al. | 303/21 E B |
| 4,035,698 | 7/1977 | Soderberg | 105/61 |
| 4,116,294 | 9/1978 | Johnson | 180/197 |
| 4,136,303 | 1/1979 | Almquist et al. | 105/61 |
| 4,354,568 | 10/1982 | Griesebrock | 180/197 |
| 4,399,886 | 8/1983 | Pollman | 180/197 |
| 4,760,893 | 8/1988 | Sigl et al. | 180/197 |

FOREIGN PATENT DOCUMENTS

| | | |
|---|---|---|
| 0226844 | 11/1986 | European Pat. Off. . |
| 2260916 | 6/1974 | Fed. Rep. of Germany . |
| 2848595 | 5/1980 | Fed. Rep. of Germany . |
| 2949237 | 6/1980 | Fed. Rep. of Germany . |
| 3543073 | 6/1987 | Fed. Rep. of Germany . |
| WO81/03471 | 12/1981 | PCT Int'l Appl. .................. 180/197 |

Primary Examiner—David M. Mitchell
Attorney, Agent, or Firm—Harness, Dickey & Pierce

[57] ABSTRACT

For the drive of a vehicle having at least one driven axle, in particular a rail vehicle, a secondarily controlled hydrostatic drive is provided which is connected to a pressure network with impressed pressure. The respective travelling direction and the acceleration and retardation is set at a desired value pickup or generator which is part of a speed control circuit. The circuit arrangement according to the invention solves the problem of avoiding slipping of the drive wheels on acceleration and retardation. In addition, the determined acceleration and retardation values can be superimposed to avoid inadmissible wheel slip and obtain optimum accelerations and retardation operations. For this purpose the circuit arrangement employs a ramp former to which as control voltage various voltages proportional to different operating parameters are supplied, in particular a voltage dependent on the speed of rotation.

24 Claims, 2 Drawing Sheets

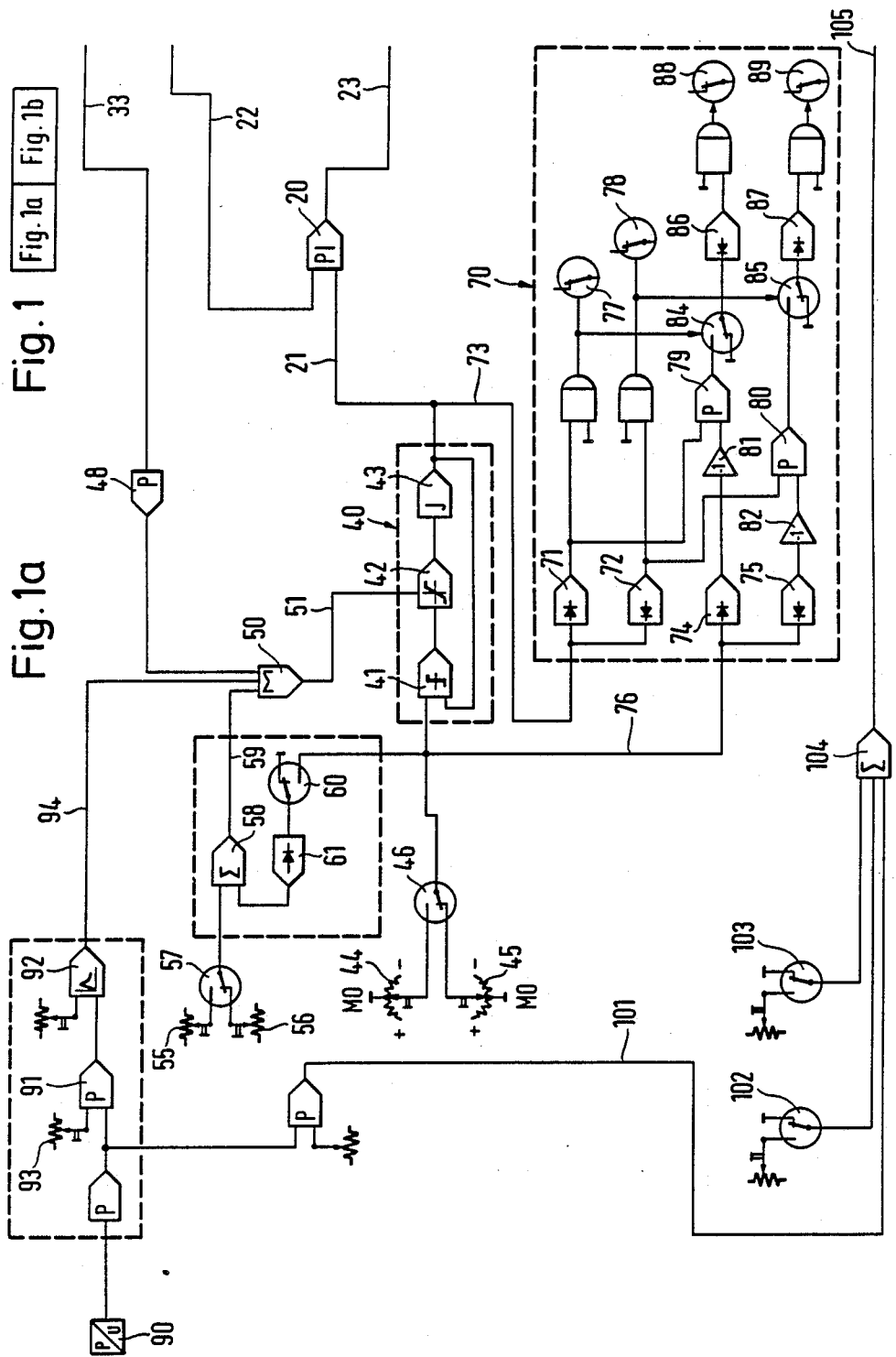

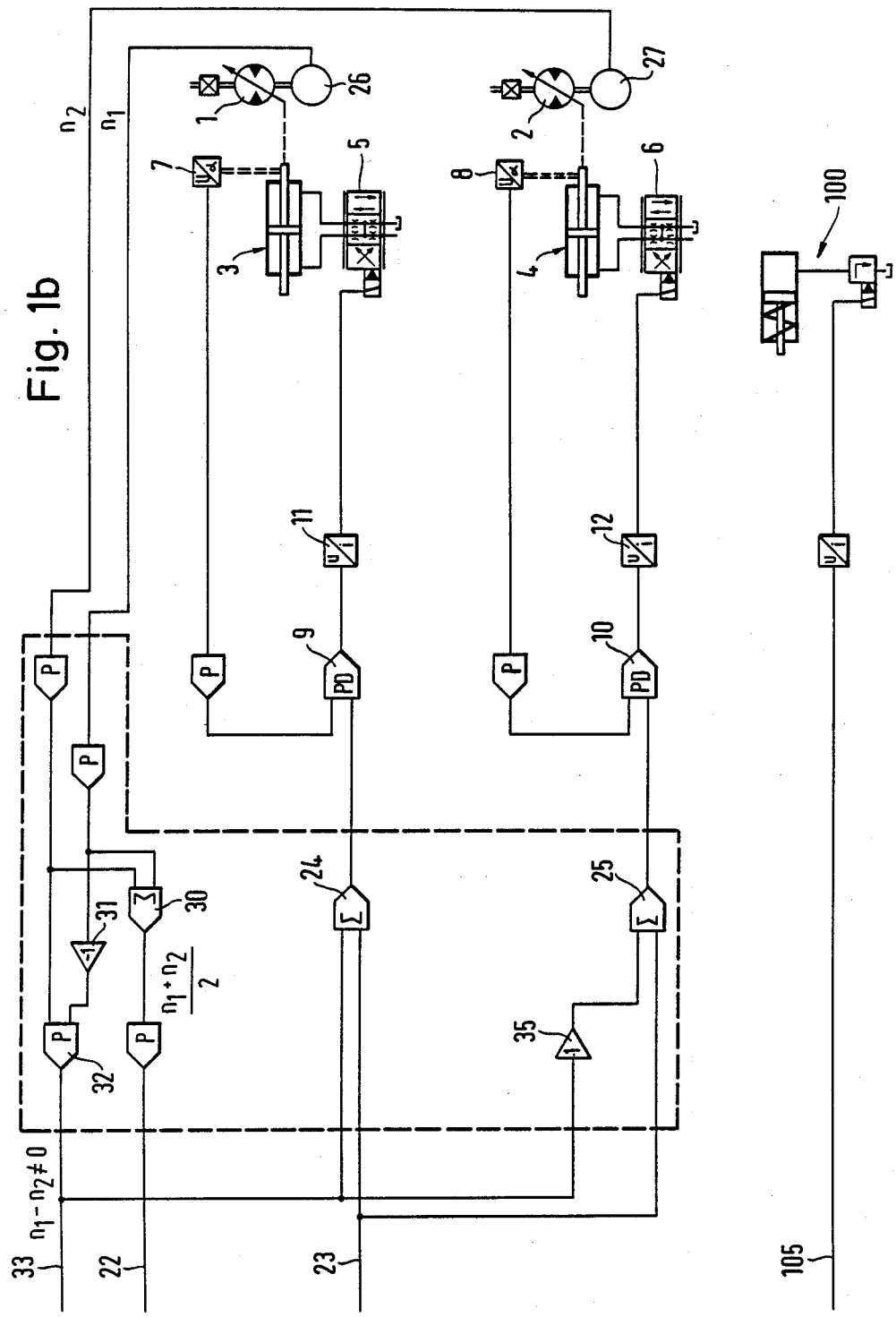

CIRCUIT ARRANGEMENT FOR THE DRIVE OF A VEHICLE

BACKGROUND OF THE INVENTION

The invention relates to a circuit arrangement for the drive of a vehicle.

In known drives for motor vehicles, in particular for rail vehicles in underground operation, as drive source an internal-combustion engine is employed, possibly an exhaust-purified diesel engine, which acts via a multistage change-speed gear on one, preferably two, drive axles. With a change-speed gear it is not possible to avoid wheel slip, in particular with rail vehicles, and obtain adequate acceleration values.

For driving motor vehicles hydrostatic machines are also known which are connected to a conduit with impressed pressure, i.e. in which a predetermined pressure is maintained. The hydrostatic machines are units of variable absorption or displacement volume, the adjustment means of which is adjustable beyond the zero point in both directions and which therefore in both directions of rotation drive a load in motor operation or in pump operation or driven by the load; in the latter case fluid can be conveyed back into the conduit and thus a hydraulic accumulator charged. By means of the setting of the adjustment means of the hydrostatic machine, which is done via a speed control circuit and possibly a position control circuit, the absorption or displacement volume of the machine and thus the torque furnished or taken up by said machine is set. Corresponding to the load conditions a speed of rotation arises which is fed back to the speed control circuit as actual value. The reference or desired value for the speed can be selected in a drive switch, the forward-reverse direction for the vehicle being governed by the polarity of the desired value signal whilst for the acceleration or retardation of the vehicle the amplitude of the desired value voltage is correspondingly increased or decreased.

Proceeding from such a hydrostatic drive, which is also referred to as secondary controlled drive because the machines are connected to the pressure network with impressed pressure and the control thus takes place secondarily, the problem underlying the invention is to further develop the drive of a vehicle having at least one driven axle so that optimum acceleration and retardation operations are possible and wheel slip is avoided irrespective of the particular load conditions occurring and the particular wheel grip.

SUMMARY OF THE INVENTION

According to the invention it is possible with very simple means to detect any wheel slip occurring and from the speed of rotation of the driven axle and a further axle a difference signal is determined which is superimposed on the output signal of the speed control circuit which represents a measure of the torque of the drive to be set in order to reduce the error signal of the speed regulator and thus the desired torque of the drive. Advantageously, the speed difference signal of the two axles is deducted from the error signal of the speed regulator and thus the torque of the drive engine reduced. The adjustment means of the drive engine is thus adjusted so that the acceleration is reduced and wheel slip avoided.

If two axles of the vehicle are driven then according to the invention the difference signal of the two speed actual values of the drives is superimposed on the error signal of the speed regulator in such a manner that the torque of the faster rotating drive is reduced and the torque of the slower rotating drive is increased. In this manner acceleration of the vehicle can be effected under optimum conditions.

In a further solution of said problem of avoiding excessive acceleration values leading to wheel slip according to the invention a ramp former is provided in which independantly of the desired value for the speed set at the desired value pickup the rise or drop of the speed desired value signal for the acceleration of retardation of the vehicle is defined and in which in dependance upon a speed difference of the axles the rise steepness is limited so that wheel slip is avoided and nevertheless high acceleration and retardation values are obtained. The edge steepness of the acceleration or retardation signal is set in the ramp former by a control voltage.

The control voltage and thus the edge steepness can be varied in accordance with differing operating parameters. If in accordance with the invention the ramp steepness for the acceleration value is varied in dependence upon the speed, i.e. when a slip of a driven axle is detected, then the acceleration value for the speed regulator is flattened, preferably reduced to zero. Furthermore, by means of the ramp former specific values can be predefined for acceleration and retardation operations and the steepness is selectable and also switchable. The predefining of such acceleration and retardation signals can be activated on operation of the desired value pickup.

Finally, the acceleration values can also be changed in dependence upon the impressed pressure in the pressure network of the drive engines. Thus, according to the invention on a pressure drop an acceleration value just set can be reduced until adequate pressure has again built up in the pressure network.

An essential feature of the invention is the so-called detection circuit with which it is possible to detect the travelling condition, i.e. whether a vehicle is travelling in the forward or reverse direction and is accelerating or retarding. It is ensured in this manner that the connection of the control circuit for the ramp former always takes place correctly, i.e. for example the control voltage for limiting the acceleration value is applied only when an acceleration is desired at the desired value pickup. This logical assignment applies respectively also to the forward and reverse travelling direction.

BRIEF DESCRIPTION OF THE DRAWINGS

An example of embodiment of the invention is illustrated in the form of a block circuit diagram in the single FIGURE of the drawing and will be explained below; the two sheets of the drawing adjoin each other.

DETAILED DESCRIPTION OF THE PREFERRED EMBODIMENTS OF THE INVENTION

In the drawing the hydrostatic machines 1 and 2 are shown which each drive an axle, not illustrated, of a rail vehicle. The absorption or displacement volume of the machine is set at a respective adjustment means 3 and 4 which is connected via a valve 5 and 6 to a pressure source P and a tank respectively.

The connection of the machines 1 and 2 to a conduit network with impressed pressure is not illustrated. In motor operation the machines withdraw fluid from the pressure network whilst in pump operation, i.e. when the machines 1 are driven by the axles, fluid is conveyed back to the pressure network from a tank, likewise not illustrated.

The particular setting of the adjustment means 3 and 4, i.e. the particular pivot angle of the machines 1 and 2, is sensed by a respective pickup 7 and 8 and supplied as position actual value to a position regulator 9 and 10 respectively, the other input of which is supplied with a desired value for the torque to be set. The output of the position regulators 9 and 10 is supplied via a driver stage 11 and 12 in each case to the valve 5 and 6 respectively, on adjustment of which the adjustment means 3 and 4 is actuated and thus the absorption or displacement volume of the machines 1 and 2 set.

For speed control of the two drive machines 1 and 2 a speed regulator 20 is provided to which a desired value for the speed is supplied via the line 21 and a speed acutal value is supplied via the line 22 and the output of which furnishes an error signal which is a measure of the torque to be set and which is supplied on the line 23 via a summation stage 24 and 25 in each case to the respective position regulator 9 and 10.

A tachogenerator 26 and 27 is connected to the two machines 1 and 2. The two signals $n_1$ and $n_2$ are averaged in a stage 30, i.e. the mean value $(n_1+n_2)/2$ is formed and transferred as averaged speed actual value via the line 22 to the speed regulator 20.

In addition, the one speed signal $n_1$ is inverted in a stage 31 and supplied together with the speed signal $n_2$ of the other driven axle to the comparison stage 32 in which the difference $n_1-n_2$ of the two speed signals is formed. The difference signal appears on the line 33 and is also supplied to the other inputs of the summation stages 24 and 25.

The mode of operation of the circuit arrangement explained above is as follows: in the speed regulator 20 the desired value for a desired speed is compared with the mean value of the speed occurring at the drives and an error signal formed therefrom which is supplied as instantaneous signal to the two position regulating circuits of the drives. This effects an adjustment of the machines with which a desired speed of rotation can be achieved. With adequate wheel grip and appropriate travelling surface nature the speeds of the two driven axles are the same and there is no signal on the line 33. As soon as a driven axle loses wheel grip due to poor travelling surface constituency or excessive acceleration, the speed signal of said axle increases and the comparison stage 32 furnishes a positive or negative difference signal which indicates the wheel slip. This difference signal is added in the summation stages 24 and 25 to the error signal of the speed regulator 20 on the line 23, this being done with different polarity. For this purpose the inverter 35 is provided. Accordingly, the difference signal for the drive with the higher speed is deducted from the error signal to reduce the torque set for said drive whilst the difference signal is added to the error signal of the other unit with the lower speed to increase the torque for said unit.

In this manner on the one hand wheel slip is avoided and on the other hand the traction force is maintained and an adequate acceleration achieved.

The vehicle in the example of the embodiment is one with two driven axles. If the drive of the second axle is removed the speed thereof can also be measured by a tachogenerator and the difference signal formed on the line 33. This difference signal is then only supplied to the drive of the one axle to reduce the torque thereof on occurrence of wheel slip.

Connected in front of the speed regulator 20 is a ramp former 40 by which when the desired value signal for the speed changes the edge steepness of the change is adjustable. The ramp former 40 consists of an input stage 41 with a jump function, a limiter stage 42 and an integrating stage 43 as output. The input stage 41 has two inputs: the first input is subjected to the output signal of the integrating stage 43 and the second input to the speed desired value which can be set at one of two desired value pickups 44, 45. In the example of the embodiment two parallel desired value pickups or generators are provided when the vehicle has a separate driver station facing the front and rear of the vehicle respectively for each direction of travel. The desired value pickup to be operated is selected via a switch 46.

The desired value generators or pickups 44, 45 are master switches of usual construction having a centre position MO from which the control lever can be pivoted for forward travel in one direction and in the other direction for reverse travel, voltage signals of different polarity corresponding to the desired acceleration and travelling speed being sent to the input of the ramp former 40.

The difference signal between the two speeds $n_1$ and $n_2$ formed in the comparison stage 32 is supplied via the line 33, an absolute value former 48 and a summation stage 50 as control voltage on the line 51 to the limiter stage 42.

The speed-dependent setting of the leading edge of the desired value signal for the speed is made in the following manner: if different signals are present at the two inputs of the input stage 41 this indicates that from the desired value pickup 44 or 45 there is a signal change in the sense of acceleration or retardation which the output signal of the integrating stage 43 slowly follows. In this case the input stage 41 switches through so that at its output a fixed voltage of different polarity appears for acceleration and retardation, this voltage being applied to the input of the limiter stage 42. Said voltage is limited by the limiter stage 42 coresponding to the control voltage superimposed thereon via the line 51, which is the higher the greater the speed difference between two driven axles because wheel slip possibly occurs on acceleration. The output voltage reduced in dependence upon the speed in this manner by the limiter stage 42 is now integrated in the integrating stage 43. The smaller the voltage supplied to the integrating stage 43 the flatter the leading or trailing edge of the speed desired value signal on the line 21. In contrast, the greater the voltage supplied to the integrating stage 43 the steeper the ramp until the output voltage is reached, which is governed by the amplification factor of the integrating stage 43. Thus, the ramp steepness with which an acceleration or retardation of the drive takes place may be adjusted via the control voltage of the limiter stage 42.

As mentioned, the ramp former 40 is also operative in a braking operation. Both for acceleration and for retardation predetermined steepnesses of the signal ramp can be set. For this case potentiometers 55 and 56 respectively are provided which can be connected via a switch 57 so that via the summation stage 58 a control voltage is supplied to the summation stage 50 via the line 59, said voltage being tapped off as reference voltage at the potentiometer 55 or 56 respectively. Irrespective of the particular position of the drive control lever and thus of the speed selected at the desired value pickup an acceleration or retardation value defined by the reference voltages can be set and acts on the limiter stage 42 in such a manner that a predetermined value for the drive is not exceeded. Thus, irrespective of the position of the drive switch 44, 45 a predetermined accleration ramp or retardation ramp can be followed. If on acceleration due to wheel slip a speed value differing from zero arises on the line 33 then said value is summated in the summation stage 50 and reduces the control voltage on the line 51 so that the ramp is flattened by the limiter stage 42. This means that the increase of the speed desired value during acceleration is immediately reduced when wheel slip takes place.

On switching the switch 57 to the potentiometer 56 a predetermined ramp stiffness for the speed reduction is likewise generated in the ramp former.

Via a further switch 60 and a diode circuit 61, which is conductive for the signal only in one direction, the second input of the summation stage 58 can be supplied with a signal for increasing the ramp steepness in a braking operation. An additional braking action is thus achieved via the control voltage on the line 59 when the braking action is to be intensified and the control drive lever of the desired value pickup 44, 45 is adjusted oppositely to the particular travelling direction set beyond the centre position into the opposite direction so that a contact 60 coupled to the desired value pickup switches over and the voltage set at the desired value pickup is thus supplied to the summation stage 58.

Since each drive machine 1, 2 operates in four-quadrant mode, i.e. the acceleration and retardation take place both in forward and reverse operation and the machines thus operate in both directions of rotation in motor and pump mode without the particular operating mode being apparent from the direction of rotation and the position of the adjustment means, a detection circuit 70 must be provided which detects whether the drive is going forward or backward and is being accelerated or retarded.

The detection circuit 70 comprises diodes 71, 72 which are each connected via a line 73 to the output of the ramp former 40 and diodes 74, 75 which are connected via a line 76 to the input of the ramp former 40. The outputs of the diodes 71 and 72 are connected to switches 77, 78 and to comparison stages 79, 80, the second input of which is connected in each case via an inverter 81, 82 to the output of the diodes 74 and 75. Furthermore, the outputs of the diodes 71 and 72 via a respective switch 84 and 85 control the outputs of the comparison stages 79 and 80 which via a further diode 86, 87 in each case actuate switches 88, 89.

The travelling direction or opposite travelling direction, whether the vehicle is moving forward or backward, is detected in the diode circuits 71, 72 because the travelling direction is defined by the polarity of the output signal of the ramp former 40 on the line 21. If the switch 77 closes, the vehicle moves forwards and when the switch 78 closes, the vehicle moves backwards.

If the vehicle is moving forwards the switch 84 is also switched over and the comparison stage 79 receives at both inputs a signal when the diode circuit 74 furnishes an acceleration signal on the line 76 which is inverted in the stage 81. The switch 88 is thereby activated and switches over so that on actuation of said switch the vehicle is accelerated in the forward direction. If the switch 88 does not switch over, i.e. there is no signal at this output of the detection circuit 70, then this detects that the vehicle is being retarded in the forward direction. The same applies to the acceleration and retardation in the reverse direction of the vehicle. For this purpose, the output of the diode 72 renders the switch 85 conductive when the vehicle is moving backward. If it is accelerating the output signal supplied by the comparison stage 80 is applied to the switch 89 which switches over and thus indicates that the vehicle is being accelerated in the reverse direction. If the switch 89 remains in the position illustrated the vehicle is being retarded in the reverse direction.

The switches 77, 78 and 88, 89 of the detection circuit 70 control a higher-ranking logic circuit which is not illustrated and by which inter alia the switch 57 is switched over so that on detection of the travelling direction different ramp steepnesses for the acceleration and retardation may be followed corresponding to the reference voltages set at the potentiometers 55 and 56.

The ramp former 40 may further be controlled in dependence upon the pressure from the relationship between the speed and the acceleration and braking to change the ramp steepness. Thus, in the pressure conduit, not shown, with the impressed pressure a pressure pickup 90 is provided and the signal thereof is likewise supplied via a comparison stage 91 and a timing stage 92 to the summation stage 50 to vary the control voltage for the limiter stage 42 in the sense of a flatter signal ramp when the impressed pressure has dropped beneath a predetermined value. The predetermined value is set at a potentiometer 93 so that the comaprison stage 91 generates the necessary control voltage when the pressure drops below the value set at the potentiometer 93. In a further development by means of the timing stage it is ensured that the switching off of the acceleration takes place very rapidly, whereupon a phase follows in which the control voltage on the line 94 is again slowly increased to permit a gradual acceleration. The ramp former 40 thus operates in dependence upon several operating parameters, i.e. in dependence upon the speed difference between two axles, in dependence upon the impressed pressure in the pressure network and in dependence upon predetermined acceleration and retardation values.

The signal furnished by the pressure pickup 90 can also be employed to control the speed of the drive which drives the pump which maintains the impressed pressure in the pressure network. The speed adjustment of the drive machine, not shown, by means of a speed control means 100 takes place in dependence upon the pressure signal on the line 101 and two switches 102, 103, of which the switch 102 is actuated when an acceleration operation is taking place and of which the switch 103 is acutated when the desired value pickup 44, 45 is in a position which corresponds for example to a normal or average travelling speed. Via a summation stage 104 and a line 105 the set reference voltages switched by the switches 102, 103 and/or the pressure signal on the line 101 can be applied to the means 100 for the speed control. The speed of the drive machine is thus increased to maximum speed when the switch 102 is actuated and when the primary pressure measured by the pressure pickup 90 drops. If on the other hand the switch 103 is switched over the speed of the drive machine is set to a mean speed because in this travelling stage a mean requirement is to be expected.

I claim

1. A control circuit arrangement for the drive of a vehicle having at least two axles, a driven axle and a second axle, the control circuit arrangement comprising a hydrostatic machine coupled to the driven axle with adjustable absorption and displacement volumes in both directions of rotation for driving said driven axle in forward or reverse directions and for braking said driven axle in either direction of rotation, said hydrostatic machine being connected to a pressure network with impressed pressure, a valve means for operating an adjustment means of said hydrostatic machine for adjusting its absorption and displacement volume, a speed control circuit responsive to a speed desired value and a speed actual value signal for generating an error signal for driving said valve means, a means for providing the speed actual value signal from the speed of said driven axle to the speed control circuit, a means for providing a difference signal from the difference formed between the speed actual value signal and a signal corresponding to the speed of the second axle of the vehicle, a means for comparing said difference signal with said error signal, and a means for reducing the torque of the drive in response to a comparison of said difference signal and said error signal.

2. Circuit arrangement according to claim 1 further comprising a second adjustable hydrostatic machine coupled to said second axle for driving said second axle and valve means, and a speed control circuit for adjusting said second hydrostatic machine characterized in that the difference between the speed actual value signal of the two driven axles is formed and the difference signal is compared with the error signal supplied to the two valve means for reducing the torque of the drive with the higher speed and to increase the torque of the drive with the lower speed.

3. Circuit arrangement according to claim 2, characterized in that for each valve means a summation stage is provided to which the error signal and the difference signal formed is supplied.

4. Circuit arrangement according to claim 3, further comprising an invertor means for deducting the difference signal in the drive with the higher speed from the error signal and for adding the difference signal in the drive with the lower speed to the error signal.

5. Circuit arrangement according to claim 4, characterized in that each summation stage is transmits a control signal to a position control circuit, the regulator of which drives the respective valve.

6. Circuit arrangement, in particular according to claim 1, comprising a controller switch for providing the speed signal, characterized in that a ramp former is provided between a pickup for the speed desired value and the speed control circuit in which the rate of change of speed is predefined and in which the rate of change of speed is variable in dependence upon the speed difference.

7. Circuit arrangement according to claim 6, characterized in that the ramp former comprises an input member with jump function, a limiter stage and an integrating stage, the input member having in each case an input for the desired value signal and the output signal of the integrating stage, and the input member furnishing on a difference between both signals a voltage which is reduced in the following limiter stage in response to a control voltage applied to the limiter stage and supplied to the integrating stage, the output signal of which has a steepness proportional to the control voltage.

8. Circuit arrangement according to claim 1, characterized in that a summing means is provided to supply the actual value input of the speed regulator with the mean value of the speeds of the two axles.

9. Circuit arrangement according to claim 8, characterized in that the control voltage for the limiter stage is dependent on the difference signal of the speeds of two axles.

10. Circuit arrangement according to claim 9, charcterized in that reference voltages adjustable at potentiometers for the acceleration and retardation can be supplied as control voltage to the limiter stage to obtain a predetermined steepness for the rate of change of speed.

11. Circuit arrangement according to claim 10, characterized in that the speed-difference-dependent control voltage and the control voltage for the rate of change of speed are applied via a summation stage to the limiter stage.

12. Circuit arrnagement according to claim 11, characteried in that on actuation of the desired value pickup in the retardation direction the steepness of the ramp function for the deceleration is influenced in the opposite direction in proportion to the deflection of the desired value pickup.

13. Circuit arrangement according to claim 10, characterized in that between the potentiometers and the summation stage a further summation stage is provided to the first input of which the voltage tapped from a potentiometer is applied and the second input of which is connected via a contact to the input of the ramp former, the switch-over on braking to a maximum retardation value taking place in dependence upon the actuation of the contact by the desired value pickup.

14. Circuit arrangement according to claim 13 for drives operating in four-quadrant mode wherein acceleration and retardation operations of the drives can occur in either forward or reverse operation, characterized in that a detection circuit is provided for the acceleration and retardation operations and comprises two comparison stages, the first comparison stage being supplied with the signal set at the desired value pickup for a rate of change of speed and a first signal corresponding to the traveling direction and the second comparison stage being supplied with the second signal set at the desired value pickup for the rate of change of speed and a second signal corresponding to the opposite traveling direction.

15. Circuit arrangement according to claim 14, wherein the detection circuit is supplied with signals having a given polarity for the traveling direction and signals having a different polarity for the opposite traveling direction.

16. Circuit arrangement according to claim 14, characterized in that the signal for the travelling or opposite travelling direction is taken from the input of the speed regulator.

17. Circuit arrangement according to claim 14, characterized in that the signal for an acceleration or deceleration is taken from the output of the ramp former.

18. Circuit arrangement according to claim 17, characterized in that to each comparison stage a switch is connected which is switched through in dependence upon the travelling direction.

19. Circuit arrangement according to claim 18, characterized in that the output of the detection circuit is formed by four signal lines which carry a signal or no signal corresponding to a rate of change of speed in each case in one of two travelling directions.

20. Circuit arrangement according to claim 19, characterized in that the inputs of the detection circuit are formed by diode circuits.

21. Circuit arrangement according to claim 20, characterized in that the control voltage for the limiter stage of the ramp former is variable in dependence upon a pressure value signal supplied by a means for determining the pressure in a pressure source for the hydrostatic machine.

22. Circuit arrangement according to claim 21, characterized in that when the pressure drops beneath a predetermined value the acceleration or retardation ramp of the speed desired value signal at the ramp output is slowed down.

23. Circuit arrangement according to claim 22, characterized in that the pressure-dependent control voltages supplied to the summation stage of the limiter stage are led via a timing stage in which the control voltage on a pressure drop is rapidly lowered and thereafter slowly increased.

24. Circuit arrangement according to claim 23, characterized in that the speed of the drive for the pressure buildup in the pressure network with impressed pressure is adjustable in dependence upon the drive position selected at the desired value pickup, the pressure in the pressure network and an acceleration operation.

* * * * *